(12) United States Patent
Danielsson et al.

(10) Patent No.: US 12,519,950 B2
(45) Date of Patent: Jan. 6, 2026

(54) SYSTEM AND METHOD FOR IMAGE ENCODING

(71) Applicant: Axis AB, Lund (SE)

(72) Inventors: Niclas Danielsson, Lund (SE); Xing Danielsson Fan, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/901,464

(22) Filed: Sep. 30, 2024

(65) Prior Publication Data

US 2025/0133215 A1  Apr. 24, 2025

(30) Foreign Application Priority Data

Oct. 19, 2023 (EP) .................................. 23204613

(51) Int. Cl.
  *H04N 19/154* (2014.01)
  *H04N 19/119* (2014.01)
  (Continued)

(52) U.S. Cl.
  CPC ......... *H04N 19/154* (2014.11); *H04N 19/119* (2014.11); *H04N 19/136* (2014.11);
  (Continued)

(58) Field of Classification Search
  CPC .. H04N 19/154; H04N 19/119; H04N 19/136; H04N 19/17; H04N 19/186;
  (Continued)

(56) References Cited

U.S. PATENT DOCUMENTS 8,472,714 B2   6/2013  Brogren et al.
2008/0267296 A1* 10/2008  Shin ..................... H04N 19/176
                                              375/E7.199
(Continued)

FOREIGN PATENT DOCUMENTS

CN           110324626 A     10/2019

OTHER PUBLICATIONS

Turk, Matthew A., and Alex P. Pentland. "Face recognition using eigenfaces." Computer Vision and Pattern Recognition, 1991. Proceedings CVPR'91., IEEE Computer Society Conference on. IEEE, 1991.

(Continued)

*Primary Examiner* — Tung T Vo
(74) *Attorney, Agent, or Firm* — Volpe Koenig

(57) ABSTRACT

A method of encoding images in a video, comprises: acquiring an original image from an image sensor of a video camera; encoding the original image using a generative image model, thereby obtaining a first encoded image; decoding the image to obtain a first decoded image; identify a region of interest (ROI) of the original image; for each ROI: perform an encoding quality check by comparing several reference points in the ROI of the original image against corresponding reference points in the ROI of the first decoded image, thereby obtaining a difference; if the difference is greater than a threshold, encoding the ROI using a non-generative image model, thereby obtaining a non-generative encoded image area; providing final encoded image data comprising a) the non-generative encoded image areas for the ROI having a difference greater than the threshold and b) the first encoded image for a remaining part of the original image.

13 Claims, 4 Drawing Sheets

(51) Int. Cl.
*H04N 19/136* (2014.01)
*H04N 19/17* (2014.01)
*H04N 19/186* (2014.01)
*H04N 19/20* (2014.01)
*H04N 19/42* (2014.01)

(52) U.S. Cl.
CPC ........... *H04N 19/17* (2014.11); *H04N 19/186* (2014.11); *H04N 19/20* (2014.11); *H04N 19/42* (2014.11)

(58) Field of Classification Search
CPC ...... H04N 19/20; H04N 19/42; H04N 19/167; H04N 19/105; G06N 3/045; G06N 3/0455; G06N 3/047; G06N 3/0475; G06N 3/088; G06N 3/094
USPC .................................................... 375/240.08
See application file for complete search history.

(56) References Cited

U.S. PATENT DOCUMENTS

| | | |
|---|---|---|
| 2010/0094133 A1* | 4/2010 | Yoshiara ............... A61B 8/469 600/458 |
| 2012/0183039 A1 | 7/2012 | Rajamani et al. |
| 2017/0251220 A1* | 8/2017 | Chun ................... H04N 19/105 |
| 2020/0104990 A1 | 4/2020 | Kimura et al. |
| 2021/0169417 A1* | 6/2021 | Burton ................. A61B 5/4857 |
| 2022/0398692 A1 | 12/2022 | Jiang et al. |

OTHER PUBLICATIONS

Lee, Lily, and W. Eric L. Grimson. "Gait analysis for recognition and classification." Automatic Face and Gesture Recognition, 2002. Proceedings. Fifth IEEE International Conference on. IEEE, 2002.
Extended European Search Report issued on Feb. 5, 2024 for European Patent Application No. 23204613.6.

* cited by examiner

SYSTEM AND METHOD FOR IMAGE ENCODING

The present disclosure relates to a method of encoding images in a video, in particular to a method of encoding images using artificial intelligence and performing a quality check of the same. The disclosure further relates to an image processing system for carrying out the disclosed method.

TECHNICAL BACKGROUND

Image and video compression is widely used to reduce costs for storage and compression. They typically work by applying algorithms to encode the image/video data during compression and decode the image/video data either during playback or at reception of the data. Traditional compression often involves a number of mathematical methods, such as color space conversion, spatial compression, temporal compression etc.

More recently, methods based on machine learning, using for example convolutional neural networks and generative adversarial networks (GAN), were developed. Artificial intelligence (AI) based image codecs, where trained neural networks carry out the encoding on a transmitter side and the decoding on a receiver side, can provide high-quality images/video at significantly reduced bitrates. With this technology a plain representation of an image can be encoded by a network to output a description and/or a number of features, which can be decoded by a network trained to reconstruct the encoded image.

Besides the significantly reduced bitrates, GANs can sometimes produce better images compared to traditional codecs in the sense that GAN may create something visually appealing even when there is very little information.

However, there are also known limitations and disadvantages associated with compression using machine learning. "Hallucinations" in the context of GAN encoding refers to incorrect features or details produced by the GAN in the encoding/decoding process. There may be a number of reasons causing such behavior. Hallucinations occur when content is produced that was not present in the original data. In many applications this is not a problem since the differences are either insignificant or not relevant for a certain use of the image data. However, if the compressed data is to be used as evidence and/or in a trial or forensic investigation, it is sometimes argued that the data generated by artificial intelligence may be of lower evidentiary value. For example, the restored images may be contaminated with elements of training data.

SUMMARY

The present disclosure relates to a method of encoding images in a video, in particular to a method of encoding images using artificial intelligence and performing a quality check of the same, preferably before the encoded images are transmitted or stored. The final encoded image data may comprise both image data encoded using AI and image data encoded using conventional codecs.

A first aspect of the disclosure relates to a computer-implemented method of encoding one or more images in a video, the method comprising:
acquiring an original image from an image sensor of a video camera system;
encoding the original image using a generative image model, thereby obtaining a first encoded image;
decoding the first encoded image, thereby obtaining a first decoded image;
identifying or obtaining one or more regions of interest of the original image;
for each of the regions of interest:
performing an encoding quality check by comparing a number of reference points in the region of interest of the original image against corresponding reference points in the region of interest of the first decoded image, thereby obtaining a level of difference;
if the level of difference is greater than a threshold, encoding the region of interest using a non-generative image model, thereby obtaining a non-generative encoded image area;
providing final encoded image data comprising a) the non-generative encoded image areas for the regions of interest having a level of difference greater than the threshold and b) the first encoded image for at least a remaining part of the original image.

It can be noted that the process of generating final encoded image data, i.e., the image data that is transmitted or stored, itself comprises both encoding and decoding as well as steps of internally checking the quality of one or more regions of interest and then providing the final encoded image data. The one or more regions of interest may be, for example, a face or a part of a face, or a person, or a specific part or detail on a building or a vehicle, but could in principle be any type of item or detail for a given application.

The method can be said to be based on a discrimination between parts of the original image that are considered to be crucial for a certain application or use and parts of the original image that are less important, or at least for which it may be acceptable that the restored image may comprise some level of hallucination, for the application. The method therefore comprises the step of identifying or obtaining one or more regions of interest in the original image. As described above, the original image is both encoded to obtain a first encoded image and decoded to obtain a corresponding first decoded image. Then, for the identified one or more regions of interest, a quality check is performed in which a number of reference points in the original image are compared against the corresponding reference points in the first decoded image to obtain a level of difference for each region of interest. As a person skilled in the art would realize, there is more than one way of determining a "level of difference" for a region of interest. This is described in further detail below. As would also be understood by a person skilled in the art, the expression "performing an encoding quality check" may also to some extent be seen as a check of the corresponding decoding since it is the first decoded image that is compared against the original image. A common practice in AI generative encoding is to train the encoder and decoder networks in tandem. Once the process of assessing the encoding has been done, the method will make a decision of whether the quality is good enough to use the image data that has been generated using the generative image model or if encoding using a non-generative image model will have to be done for the area. As a final step, final encoded image data is provided which comprises a) the non-generative encoded image areas for the regions of interest having a level of difference greater than the threshold and b) the first encoded image for at least a remaining part of the original image. The final encoded image data may comprise the first encoded image for only the remaining part of the original image or for more than the remaining part of the original image, such as for the whole original image.

One advantage of providing a flexible encoded image is that by using this setup it is possible to achieve the low bitrates of the AI encoding for a maximized image part while minimizing the risks of introducing unacceptable hallucinations for key points or areas in the image.

The present disclosure further relates to an image processing system comprising:
processing circuitry configured to:
acquire an original image from an image sensor of a video camera system;
encode the original image using a generative image model, thereby obtaining a first encoded image;
decode the first encoded image, thereby obtaining a first decoded image;
identify or obtain one or more regions of interest of the original image;
for each of the regions of interest:
  perform an encoding quality check by comparing a number of reference points in the region of interest of the original image against corresponding reference points in the region of interest of the first decoded image, thereby obtaining a level of difference;
  if the level of difference is greater than a threshold, encode the region of interest using a non-generative image model, thereby obtaining a non-generative encoded image area;
provide final encoded image data comprising a) the non-generative encoded image areas for the regions of interest having a level of difference greater than the threshold and b) the first encoded image for at least a remaining part of the original image.

A person skilled in the art will recognize that the presently disclosed method of encoding one or more images in a video may be performed using any embodiment of the presently disclosed image processing system, and vice versa.

BRIEF DESCRIPTION OF DRAWINGS

Various embodiments are described hereinafter with reference to the drawings. The drawings are examples of embodiments and are intended to illustrate some of the features of the presently disclosed system and method of encoding images in a video.

DETAILED DESCRIPTION

Figure 1:
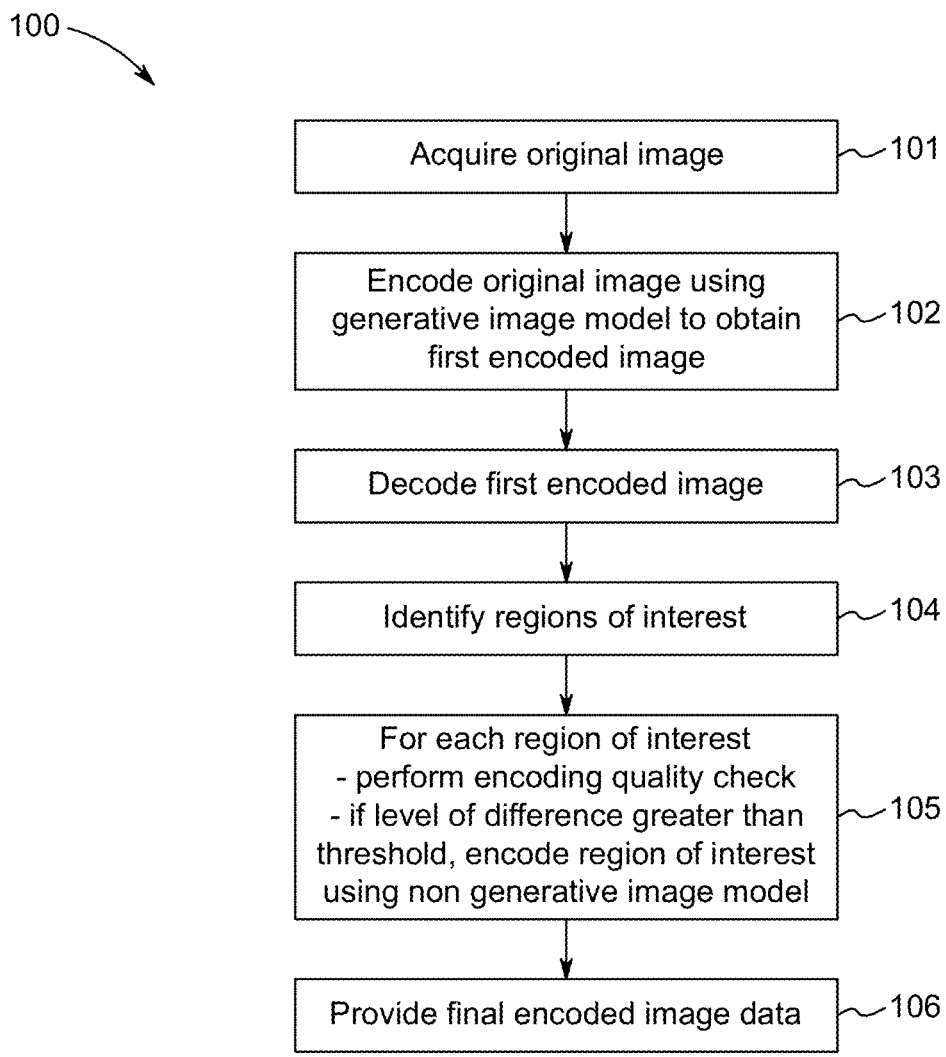
FIG. 1 shows a flow chart of a method according to an embodiment of the presently disclosed method of encoding one or more images in a video.

The present disclosure relates to a method of encoding one or more images in a video. FIG. 1 shows a flow chart of a method 100 according to an embodiment of the presently disclosed method of encoding one or more images in a video. The method may comprise the step of acquiring one or more original image(s) from an image sensor of a video camera system (101). The acquired image may then be encoded using a generative image model to obtain a first encoded image (102). The method may further comprise the step of decoding the first encoded image to obtain a first decoded image (103). The decoding may be performed as part of the encoding process on a transmitter side. The method may further comprise the step of identifying or obtaining one or more regions of interest of the original image (104). For each of the regions of interest it is possible to perform an encoding quality check by comparing a number of reference points in the region of interest of the original image against corresponding reference points in the region of interest of the first decoded image, thereby obtaining a level of difference for each region of interest. If the level of difference is greater than a threshold for a region of interest, the region of interest can be encoded using a non-generative image model (105). The method may further comprise the step of providing final encoded image data comprising a) the non-generative encoded image areas for the regions of interest having a level of difference greater than the threshold and b) the first encoded image for at least a remaining part of the original image (106).

An "image model" can be said to include a functional definition (e.g., functional specification, pseudocode, equations) of an encoder and a functional definition of a decoder, which are adapted to convert images to and from a common image data format. The image data may be digital data. Generative image models may include one or more of a machine-learning based encoder, an AI-based encoder, an artificial neural network encoder, a generative adversarial network (GAN) encoder, a variational autoencoder (VAE), a convolutional neural network (CNN) encoder and a recurrent neural network (RNN) encoder. If, for example, a GAN encoder is used, the first encoded image may be referred to as a GAN-encoded image and the first decoded image may be referred to as a GAN-decoded image.

In contrast, using a non-generative image model may generally refer to the opposite, i.e., more conventional ways of encoding images or video, which do not create information that was not in the original image or video using any of a machine-learning based encoder, an AI-based encoder, an artificial neural network encoder, a generative adversarial network (GAN) encoder, a variational autoencoder (VAE) encoder, a convolutional neural network (CNN) encoder and a recurrent neural network (RNN) encoder. For example, encoding of an image using a non-generative image model may be seen as encoding the image without inserting information derived from images other than the encoded. If the image is a frame of a video sequence, encoding the image using a non-generative image model may be seen as encoding the image without inserting information derived from images outside the video sequence. Alternatively, the process of encoding an image using a non-generative image model may be seen as encoding the image without processing the image by a function that depends on information derived from images other than the image, or if the image is a frame in a video sequence, without processing image by a function that depends on information derived from images outside the video sequence. Examples of non-generative image model include, but are not limited to, transform coding, a combination of predictive coding (for example, interframe time-predictive coding) and transform coding (so-called hybrid coding), ITU H.26x, in particular H.264, H.265 and H.266, AOMedia Video 1 (AV1), versions of JPEG, such as JPEG2000. At least H.26x and AV1 can be described as image models with hybrid coding.

Figure 2:
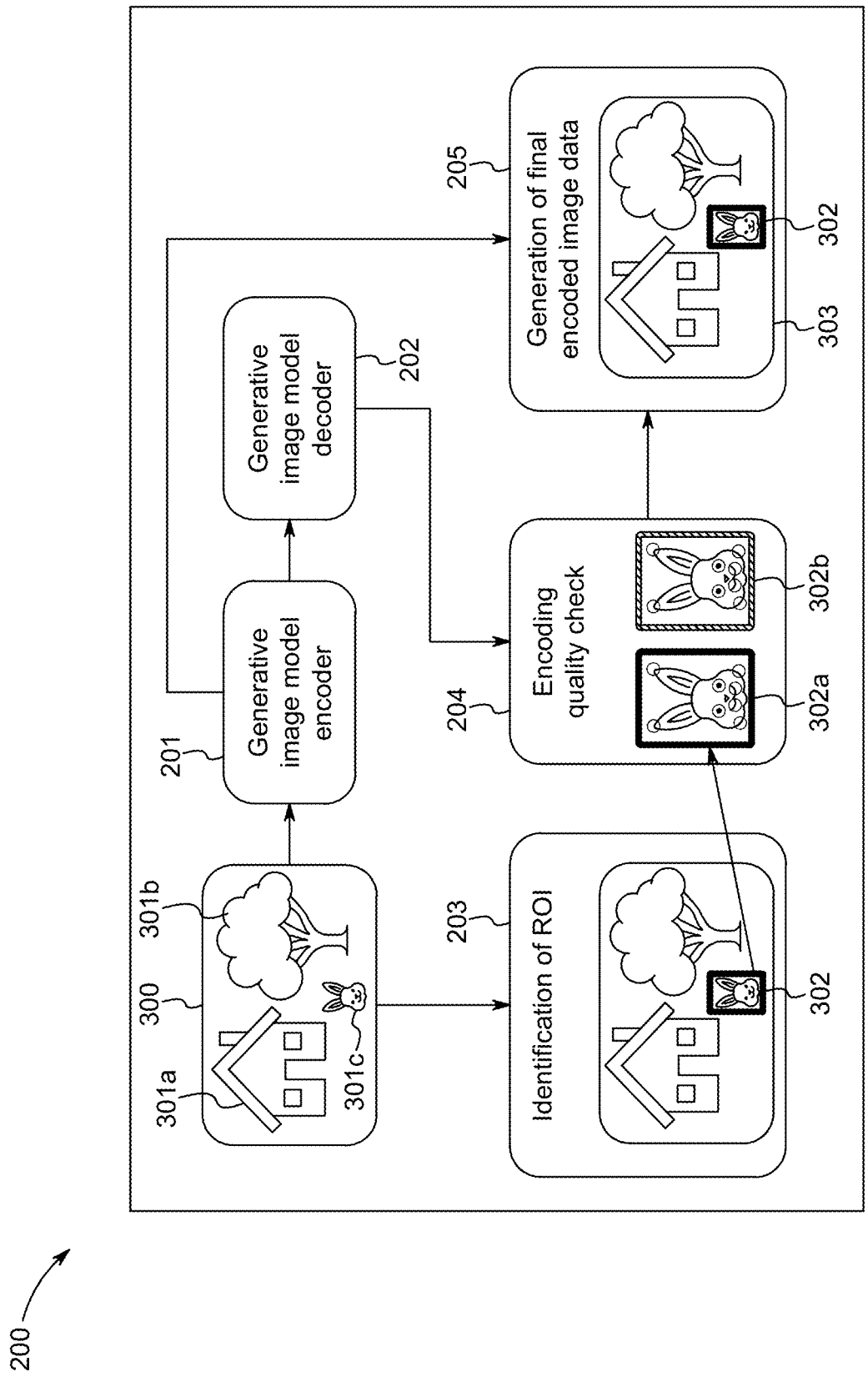
FIG. 2 shows an example of a process of encoding an image according to an embodiment of the presently disclosed method.

FIG. 2 shows an example of a process 200 of encoding an image according to an embodiment of the presently disclosed method. In the upper left corner an original image 300 can be used as starting point. The original image 300 comprises a house 301a, a tree 301b and a rabbit 301c, the latter representing the object of interest. By analogy the rabbit could have been a human, a human face, or any other item of interest for an application. Starting from the original image 300, two parallel tasks are now carried out. It is to be understood in this regard that the system may comprise standard hardware blocks for performing various image processing tasks on the original image 300. For example, the system may comprise an image processing pipeline (IPP) for applying different filters, for example noise filtering, segmentation etc. In this regard an "original" image shall not necessarily be seen as an unprocessed image but as a starting point and input to the presently disclosed method. It is understood that a camera has an image sensor that captures light and that the image sensor creates signals that are processed to create the original image. The tasks of the presently disclosed method do not have to be performed in any particular order but can be carried out in any suitable order. Preferably, the whole original image 300 is encoded using a generative image model 201. The encoded image is then decoded using a generative image model decoder 202. A first decoded image is thereby obtained. It can be seen in FIG. 2 that the first decoded image is used in the encoding quality checker 204. The original image 300 may also be used in a process 203 of identifying one or more regions of interest 302 of the original image 300. In the step of performing an encoding quality check 204, the identified regions of interest of the original image 302a are compared against the region of interest of the first decoded image 302b. The steps of the method may be arranged such that the identification of one or more regions of interest of the original image is carried out before the first decoded image is sent for quality check. In the example of FIG. 2 it can be seen that the "face" of the rabbit has been identified as a region of interest. In the quality check a number of reference points in the region of interest of the original image are now compared against corresponding reference points in the region of interest of the first decoded image. This is further described and exemplified in FIG. 3. If the difference between the original image 302a and the first decoded image 302b is too big in this regard (level of difference exceeds a threshold) the region of interest is encoded using a non-generative image model, which in practice may be a conventional codec. In the step of providing/generating 205 the final encoded image data 303, the final encoded image data is prepared such that it comprises the non-generative encoded image areas for the regions of interest having a level of difference greater than the threshold and the first encoded image for at least a remaining part of the original image i.e., potentially a mix of image data being generated using generative and non-generative image models.

The step of identifying one or more regions of interest of the original image may comprise detecting an object in the original image. The step of detecting an object may comprise applying a machine learning model, such as a neural network, trained to detect the object. Alternatively, or in combination, the step of identifying one or more regions of interest of the original image may comprise defining the one or more regions of interest on the basis of a location of a detected object and/or what the object is doing and/or other contextual information, such as what is happening in the scene. The step of identifying one or more regions of interest of the original image is not limited to a specific way of identifying regions or object, but actually includes a number of options. This can, for example, involve additional neural networks trained to perform such tasks. As a non-limiting example, a semantic segmentation algorithm may detect in which region(s) grass is present in the image and decide that a car on grass is an object of interest, whereas a car on road is not considered to be of interest for a certain application.

Object detection is a computer vision technique that involves locating and identifying objects within the image frames. A person skilled in that art would generally be familiar with such techniques and would know how to implement them. Convolutional Neural Networks (CNN) or other machine learning-based methods have gained popularity as they are typically very accurate and fast, but there are a number of other object detection techniques that do not rely on CNN or machine learning.

One specific non-limiting example of an object detection algorithm of a more traditional sort is the Viola-Jones detection framework. In this method the image frames are scanned with a sliding window, where each region is classified as containing or not containing an object. The method uses Haar features and a cascaded classifier to detect objects.

When an object has been detected, a set of identification characteristics may be created to describe the visual appearance of the detected object. Image data from a single image frame or a video sequence may be used to create the identification characteristics for the detected object. Various image and/or video analysis algorithms may be used to extract and create the identification characteristics from the image data. Examples of such image or video analysis algorithms are various algorithms e.g., for extracting features in a face such in Turk, Matthew A., and Alex P. Pentland. "Face recognition using eigenfaces." Computer Vision and Pattern Recognition, 1991. Proceedings CVPR'91, IEEE Computer Society Conference on. IEEE, 1991, gait features such in Lee, Lily, and W. Eric L. Grimson. "Gait analysis for recognition and classification." Automatic Face and Gesture Recognition, 2002. Proceedings. Fifth IEEE International Conference on. IEEE, 2002, or colors such in U.S. Pat. No. 8,472,714 by Brogren et al.

A database may comprise a number of objects and a number of identification characteristics. In the presently disclosed method, the step of identifying one or more regions of interest of the original image may comprise matching identification characteristics to identification characteristics in the database to classify an object as a certain type of object, for example, a car, a person or any other item. In one embodiment the step of detecting an object in the image frames comprises comparing the image frames against reference images in a database to match features corresponding to the object in the image frames and the reference images.

Classification of objects may be achieved by means of a neural network. Classifying neural networks are often used in applications like character recognition, monitoring, surveillance, image analysis, natural language processing etc. There are many neural network algorithms/technologies that may be used for classifying objects, e.g., Convolutional Neural Networks, Recurrent Neural Networks, etc.

Figure 3:
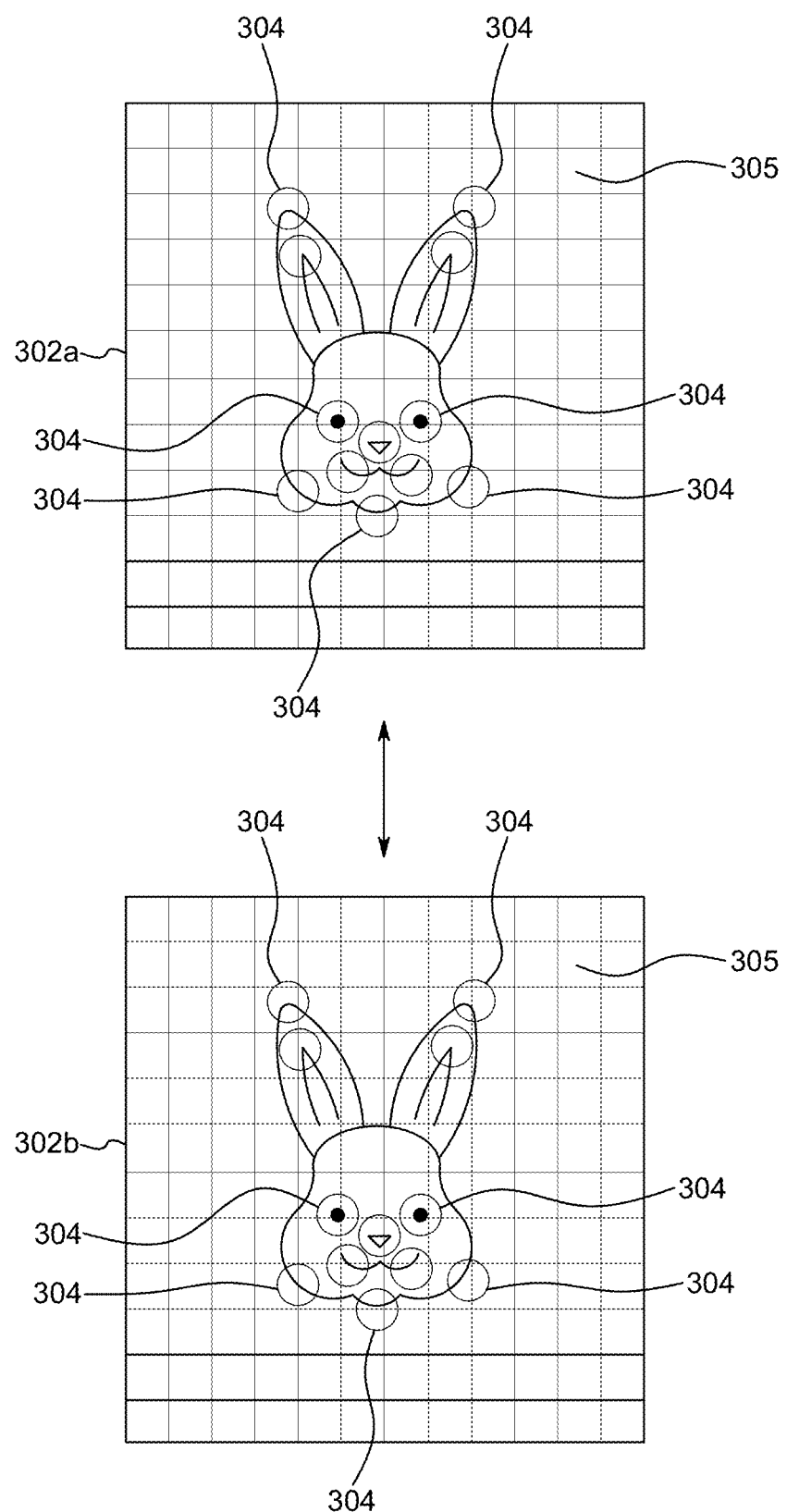
FIG. 3 shows an example of comparison of a number of reference points in a region of interest of the original image against corresponding reference points in the region of interest of a decoded image.

FIG. 3 shows an example of comparison of a number of reference points 304 in a region of interest 302a of the original image against corresponding reference points 304 in the region of interest 302b of a decoded image. There are several options and ways of implementing the encoding quality check of a region of interest. The encoding quality check is not limited to the example shown in FIG. 3. One option is to identify a number of key reference points for a given application. For example, in FIG. 3 it can be seen that a number of characteristic points of a "face" have been identified. Accordingly, one embodiment of the presently disclosed method of encoding one or more images in a video may comprise the step of identifying characteristics for a given type of content in the region of interest and selecting reference points in the identified characteristics. The identified characteristics may be any type item or feature, for example a nose and/or eyes or ears of a face and/or characteristics of a person, or characteristics of a vehicle, such as a license plate of a car, and/or characteristics of a building and/or characteristics of an animal. The actual comparison may be, for example, a pixel-by-pixel comparison for a selection of pixels.

In the illustrative example of FIG. 3 a number of reference points have been identified. The identification of reference points can be done by applying any machine learning model that has been trained to recognize certain characteristics of an image. A person skilled in the art would generally be capable of implementing or using such a model.

Another option, which can be used standalone or in combination with the option of identifying specific reference points, is to divide the region of interest into a grid, for example, as a grid having cells 305 according to the example shown in FIG. 3. The reference points can then be distributed in the region of interest to form a grid. The grid can be a grid with evenly sized and distributed cells or a grid with inhomogeneous cell size. For example, the method may comprise the step of using a function to create a grid that has larger cells in regions which can be categorized as background and smaller cells in regions which can be categorized as foreground or regions which contain a certain item or characteristic. Known methods exist that can, for example, differentiate between background and foreground in an image. Such methods would be readily available to the person skilled in the art. Generally, the reference points may be selected such that distances between the reference points in the grid do not exceed a predetermined limit. In the example in FIG. 3, the cells do not have to be evenly sized. For example, there may be smaller cells in the areas with more details and/or more local variation and/or based on the local content.

As stated, the selection of reference points may be a combination of identifying characteristics for a given type of content in the region of interest and dividing the region of interest into a grid of cells. In such a combination it is possible to have cells with a smaller size in subregion close to the identified characteristics and cells with a larger size in the remaining parts of the region of interest.

The presently disclosed method of encoding one or more images in a video may comprise the step of performing an encoding quality check by comparing a number of reference points in the region of interest of the original image against corresponding reference points in the region of interest of the first decoded image, thereby obtaining a level of difference. The "level of difference" is introduced as a way of determining whether the encoded region of interest is close enough to the original image. It can be defined and measured in several ways. For example, pixels within a certain distance from a point, or the pixels in a cell of the abovementioned grid can be compared between the region of interest of the original image and the region of interest of the first decoded image. This can be done pixel by pixel or by grouping and averaging pixels. Different techniques and approaches can be used, as would be understood by a person skilled in the art. According to one embodiment of the presently disclosed method, one can use a predefined measure of difference or dissimilarity. One example is to compute or extract an average pixel value for the pixels within a certain distance from a point, or the pixels in a cell. If the difference between the values is greater than a certain threshold the quality of the encoding of region of interest using a generative image model can be considered too low for the region of interest. Accordingly, the specific region of interest may then be encoded using a non-generative image model. Another method would be pixel-to-pixel comparison. Sum of pixel differences by accumulating pixel differences or sum of squared differences may be further alternatives. A further option may be comparison of histograms of cells of the grid. Generally, the step of obtaining a level of difference is not limited to the specific examples provided in the present disclosure.

Moreover, in one embodiment of the presently disclosed method of encoding one or more images in a video, the at least one of the regions of interest of the original image is composed of a number of image parameters, such as color and luminance, wherein the step of performing an encoding quality check is only performed for a subset of the image parameters, such as only for the luminance. For certain applications some image parameters may be irrelevant or less important. As an example, it may important that the shapes or other details of a face or a person in the encoded image do not deviate too much from the original image, whereas other parameters, such as color, may not be as significant.

The presently disclosed method of encoding one or more images in a video may comprise the generation of an aggregated encoding quality score for each region of interest. This information can be added for each region of interest to the final encoded image data. By adding encoding quality score for the regions of interest the receiver will receive not only an encoded of a certain minimum quality, but also more detailed information on how similar it is to the original image. For, example, if the level of similarity is confirmed to be very high, the compressed data may in the end be accepted as evidence and/or in a trial or forensic investigation.

The final encoded image data may comprise a) the non-generative encoded image areas for the regions of interest having a level of difference greater than the threshold and b) the first encoded image for at least a remaining part of the original image. Since the first encoded image, i.e., the image encoded using a generative image model, will typically be more compressed, it is generally desirable to have as much as possible of the first encoded image in the final encoded image data. However, in areas where the difference between the first encoded image and the original image are too significant, the final encoded image may comprise a mix of image data being generated using generative and non-generative image models. The step of decoding the final encoded image data may thus comprise decoding of the non-generative encoded image areas without relying on information derived from images other than non-generative encoded image areas and decoding of the first encoded image for at least the remaining part using a machine learning model, such as a generative adversarial network. The final encoded image data may comprise the first encoded image for only the remaining part of the original image or for more than the remaining part of the original image, such as for the whole original image. If the final encoded image data comprises the first encoded image for the whole image and the non-generative encoded image areas for the regions of interest having a level of difference greater than the threshold, it may be task on the receiving side to select the data to be used in further processing. The receiving side will then typically take into account information specifying the regions of interest.

The present disclosure further relates to a computer program having instructions which, when executed by a computing device or computing system, cause the computing device or computing system to carry out any embodiment of the presently disclosed method of encoding one or more images in a video. The computer program may be stored on any suitable type of storage media, such as non-transitory storage media.

The present disclosure further relates to an image processing system comprising:
processing circuitry configured to:
acquire an original image from an image sensor of a video camera system;
encode the original image using a generative image model, thereby obtaining a first encoded image;
decode the first encoded image, thereby obtaining a first decoded image;
identify or obtain one or more regions of interest of the original image;
for each of the regions of interest:
perform an encoding quality check by comparing a number of reference points in the region of interest of the original image against corresponding reference points in the region of interest of the first decoded image, thereby obtaining a level of difference;
if the level of difference is greater than a threshold, encode the region of interest using a non-generative image model, thereby obtaining a non-generative encoded image area;
provide final encoded image data comprising a) the non-generative encoded image areas for the regions of interest having a level of difference greater than the threshold and the first encoded image and b) the first encoded image for at least a remaining part of the original image.

Figure 4:
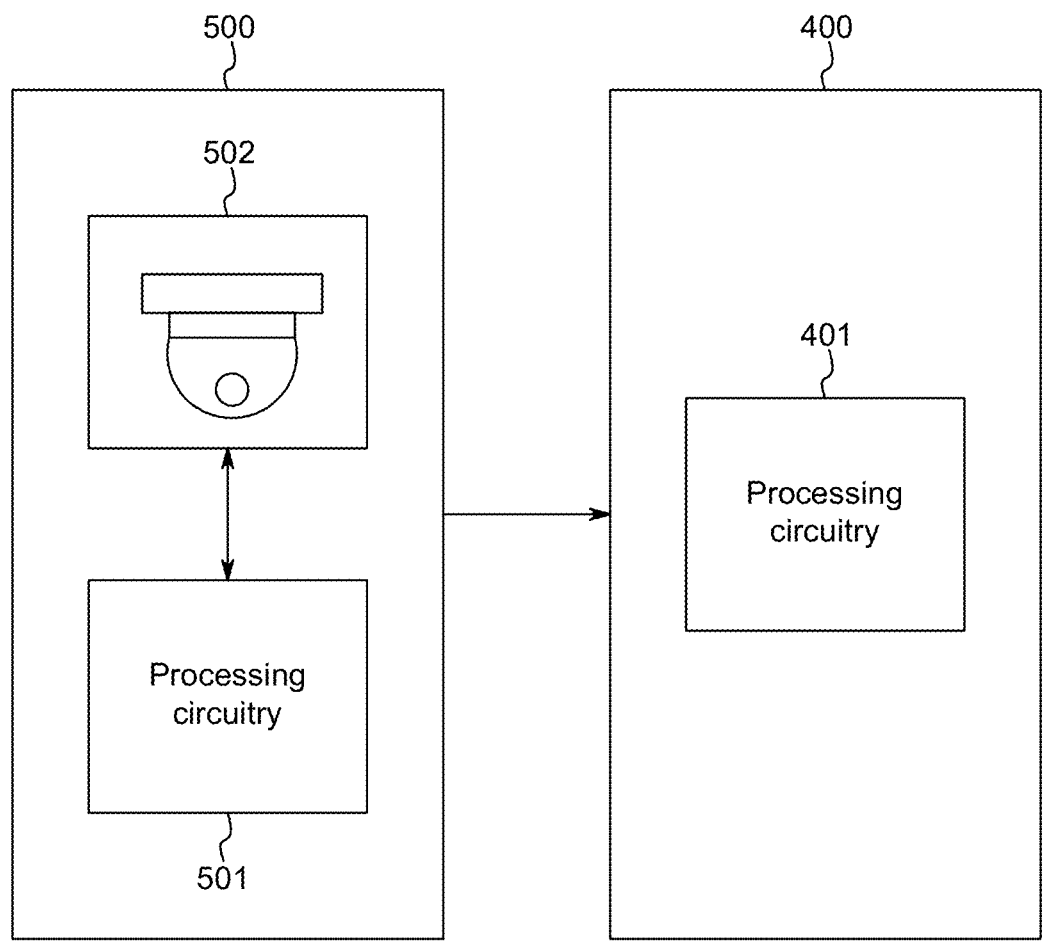
FIG. 4 shows one embodiment of the presently disclosed image processing system, wherein the presently disclosed method of encoding one or more images in a video is carried out on a transmitter side, and wherein the final encoded image data is received on a receiver side.

The processing circuitry, or further processing circuitry, may be configured to decode the final encoded image data on a receiver side. It can be noted that the encoding may thus comprise both encoding and decoding steps in order to validate and/or improve the final encoded image data before it is transmitted or stored. FIG. 4 shows an example of such an embodiment. An image processing system 500 comprises processing circuitry 501 configured to acquire images from a camera system 502. The image processing system 500 in this setup may be seen as the transmitter side of a system, which may further comprise a receiver side system 400, which has processing circuitry 401 configured to receive and decode the transmitted compressed final encoded image data. Both the step of encoding the original image using a generative image model and decoding the first encoded image as part of the encoding quality check may be carried out on a transmitter side prior to communicating the final encoded image data to the receiver side.

The image processing system may further comprise peripheral components, such as one or more memories, which may be used for storing instructions that can be executed by any of the processors. The one or more memories may include random access memory (RAM) and/or a read-only memory (ROM), or any suitable type of memory. The system may further comprise any of: internal and external network interfaces, input and/or output ports, modules for sending and receiving data wirelessly, communication interface that allows software and/or data to be transferred between the system and external devices. Software and/or data transferred via the communications interface may be in any suitable form of electric, optical or RF signals. As would be understood by a person skilled in the art, a processing circuitry may be a single processor in a multicore/multiprocessor system.

The invention claimed is:

1. A computer-implemented method of encoding one or more images in a video, the method comprising:
acquiring an original image from an image sensor of a video camera system;
encoding the original image using a generative image model, thereby obtaining a first encoded image;
decoding the first encoded image, thereby obtaining a first decoded image;
identifying or obtaining one or more regions of interest of the original image;
for each of the regions of interest:
identifying characteristics for a given type of content in the region of interest and selecting a number of reference points in the identified characteristics, and/or
dividing the region of interest into a grid of cells, wherein a number of reference points are distributed in the region of interest to form the grid of cells;
performing an encoding quality check by comparing the reference points in the region of interest of the original image against corresponding reference points in the region of interest of the first decoded image, thereby obtaining a level of difference;
if the level of difference is greater than a threshold, encoding the region of interest using a non-generative image model, thereby obtaining a non-generative encoded image area;
providing final encoded image data comprising: a) the non-generative encoded image areas for the regions of interest having a level of difference greater than the threshold; and b) the first encoded image for at least a remaining part of the original image.

2. The method according to claim 1, wherein the generative image model comprises a generative adversarial network (GAN) and/or a variational autoencoder (VAE) encoder, and wherein the first encoded image is a GAN-encoded image and/or a VAE-encoded image and the first decoded image is a GAN-decoded image and/or a VAE-decoded image.

3. The method according to claim 1, wherein the reference points are selected such that distances between the reference points in the grid do not exceed a predetermined limit.

4. The method according to claim 1, wherein the identified characteristics comprise at least one of a nose, eyes or ears of a face, or other characteristics of a person, characteristics of a vehicle, characteristics of a building or characteristics of an animal.

5. The method according to claim 1, wherein the step of identifying one or more regions of interest of the original image comprises detecting an object in the original image, preferably wherein the step of detecting an object comprises applying a machine learning model, such as a neural network, trained to detect the object.

6. The method according to claim 1, wherein the step of identifying one or more regions of interest of the original image comprises defining the one or more regions of interest on the basis of a location of a detected object.

7. The method according to claim 1, wherein at least one of the regions of interest of the original image is composed of a number of image parameters, such as color and luminance, wherein the step of performing an encoding quality check is only performed for a subset of the image parameters, such as only for the luminance.

8. The method according to claim 1, wherein the step of performing an encoding quality check comprises generating an aggregated encoding quality score for each region of interest, preferably further comprising the step of adding the aggregated encoding score for each region of interest to the final encoded image data.

9. The method according to claim 1, wherein both the step of encoding the original image using a generative image model and decoding the first encoded image are carried out on a transmitter side prior to communicating the final encoded image data to a receiver side, preferably further comprising the step of receiving and decoding the final encoded image data on a receiver side.

10. The method according to claim 9, wherein the step of decoding the final encoded image data comprises decoding of the non-generative encoded image areas without relying on information derived from images other than non-generative encoded image areas and decoding of the first encoded image for at least the remaining part using a machine learning model, such as a generative adversarial network.

11. A computer program having instructions which, when executed by a computing device or computing system, cause the computing device or computing system to carry out a method of encoding one or more images in a video, the method comprising:
   acquiring an original image from an image sensor of a video camera system;
   encoding the original image using a generative image model, thereby obtaining a first encoded image;
   decoding the first encoded image, thereby obtaining a first decoded image;
   identifying or obtaining one or more regions of interest of the original image;
   for each of the regions of interest:
      identifying characteristics for a given type of content in the region of interest and selecting a number of reference points in the identified characteristics, and/or
      dividing the region of interest into a grid of cells, wherein a number of reference points are distributed in the region of interest to form the grid of cells;
      performing an encoding quality check by comparing the reference points in the region of interest of the original image against corresponding reference points in the region of interest of the first decoded image, thereby obtaining a level of difference;
      if the level of difference is greater than a threshold, encoding the region of interest using a non-generative image model, thereby obtaining a non-generative encoded image area;
   providing final encoded image data comprising: a) the non-generative encoded image areas for the regions of interest having a level of difference greater than the threshold; and b) the first encoded image for at least a remaining part of the original image.

12. An image processing system comprising:
processing circuitry configured to:
   acquire an original image from an image sensor of a video camera system;
   encode the original image using a generative image model, thereby obtaining a first encoded image;
   decode the first encoded image, thereby obtaining a first decoded image;
   identify or obtain one or more regions of interest of the original image;
   for each of the regions of interest:
      identify characteristics for a given type of content in the region of interest and selecting a number of reference points in the identified characteristics, and/or
      divide the region of interest into a grid of cells, wherein a number of reference points are distributed in the region of interest to form the grid of cells;
      perform an encoding quality check by comparing the reference points in the region of interest of the original image against corresponding reference points in the region of interest of the first decoded image, thereby obtaining a level of difference;
      if the level of difference is greater than a threshold, encode the region of interest using a non-generative image model, thereby obtaining a non-generative encoded image area;
   provide final encoded image data comprising: a) the non-generative encoded image areas for the regions of interest having a level of difference greater than the threshold; and b) the first encoded image for at least a remaining part of the original image.

13. The image processing system according to claim 12, wherein the processing circuitry, or further processing circuitry, is configured to decode the final encoded image data on a receiver side.

* * * * *